(12) United States Patent
Aoki et al.

(10) Patent No.: US 9,731,275 B2
(45) Date of Patent: Aug. 15, 2017

(54) CATALYTIC CONVERTER

(71) Applicants: Yuki Aoki, Seto (JP); Hiromasa Suzuki, Toyota (JP); Hiroyuki Matsubara, Gifu (JP)

(72) Inventors: Yuki Aoki, Seto (JP); Hiromasa Suzuki, Toyota (JP); Hiroyuki Matsubara, Gifu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 110 days.

(21) Appl. No.: 14/761,808

(22) PCT Filed: Nov. 26, 2013

(86) PCT No.: PCT/JP2013/081729
§ 371 (c)(1),
(2) Date: Jul. 17, 2015

(87) PCT Pub. No.: WO2014/115420
PCT Pub. Date: Jul. 31, 2014

(65) Prior Publication Data
US 2015/0352523 A1    Dec. 10, 2015

(30) Foreign Application Priority Data

Jan. 23, 2013  (JP) ................................ 2013-010083

(51) Int. Cl.
*B01D 50/00* (2006.01)
*B01J 23/42* (2006.01)
(Continued)

(52) U.S. Cl.
CPC .............. *B01J 23/42* (2013.01); *B01D 53/94* (2013.01); *B01D 53/945* (2013.01); *B01J 23/40* (2013.01);
(Continued)

(58) Field of Classification Search
CPC .............. F01N 3/2803; F01N 2330/48; F01N 2510/0684; B01D 2255/1021; B01D 2255/9022; B01J 23/63
(Continued)

(56) References Cited

U.S. PATENT DOCUMENTS

| 2002/0042344 A1* | 4/2002 | Kondo ................. B01J 35/0006 502/56 |
| 2010/0111796 A1* | 5/2010 | Caudle ............... B01D 53/9468 423/239.2 |
| 2013/0213000 A1 | 8/2013 | Segawa |

FOREIGN PATENT DOCUMENTS

| CA | 2 485 893 A1 | 4/2005 | |
| GB | 2342055 A * | 4/2000 | ........... B01D 53/885 |

(Continued)

*Primary Examiner* — Tom P Duong
(74) *Attorney, Agent, or Firm* — Sughrue Mion, PLLC

(57) ABSTRACT

Provided is a catalytic converter in which the entire catalyst constituting the catalytic converter can be efficiently utilized to purify exhaust gas, and the emission of hydrogen sulfide can be suppressed.
A catalytic converter 10 includes catalyst layers 2A, 2B formed of a noble metal catalyst that are formed on cell wall surfaces of a substrate 1 having a cell structure in a longitudinal direction of the substrate 1 in which gas flows, in which the substrate 1 has a center region 1A having a relatively high cell density and a peripheral region 1B having a relatively low cell density, and lengths of the catalyst layers 2A, 2B of the center region 1A and the peripheral region 1B in the longitudinal direction are the same as each other, or the length of the catalyst layer 2B in the longitudinal direction is shorter than that of the catalyst layer 2A.

2 Claims, 4 Drawing Sheets

(51) Int. Cl.
  *B01J 23/46* (2006.01)
  *B01J 35/04* (2006.01)
  *F01N 3/28* (2006.01)
  *B01J 37/02* (2006.01)
  *B01J 23/40* (2006.01)
  *B01J 35/00* (2006.01)
  *B01J 23/63* (2006.01)
  *B01D 53/94* (2006.01)

(52) U.S. Cl.
  CPC ............ *B01J 23/464* (2013.01); *B01J 23/63* (2013.01); *B01J 35/0006* (2013.01); *B01J 35/04* (2013.01); *B01J 37/0244* (2013.01); *F01N 3/2803* (2013.01); *B01D 2255/1021* (2013.01); *B01D 2255/1023* (2013.01); *B01D 2255/1025* (2013.01); *B01D 2255/9022* (2013.01); *B01D 2255/9032* (2013.01); *F01N 2330/48* (2013.01); *F01N 2510/0682* (2013.01); *F01N 2510/0684* (2013.01); *Y02T 10/22* (2013.01)

(58) Field of Classification Search
  USPC ..................... 422/177, 180; 55/523; 428/116
  See application file for complete search history.

(56) References Cited

FOREIGN PATENT DOCUMENTS

| | | |
|---|---|---|
| GB | 2342055 A | 5/2000 |
| JP | 2002-177794 A | 6/2002 |
| JP | 2005-131551 A | 5/2005 |
| JP | 2008-018370 A | 1/2008 |
| JP | 2010-005590 A | 1/2010 |
| JP | 2012-096201 A | 5/2012 |
| WO | 2010/001226 A1 | 1/2010 |

* cited by examiner

DISTANCE FROM CENTER (0) OF SUBSTRATE

RATIO (%) OF LENGTH OF CATALYST LAYER
OF PERIPHERAL REGION TO LENGTH OF SUBSTRATE
(LENGTH OF CATALYST LAYER OF CENTER
REGION TO LENGTH OF SUBSTRATE: 80%)

CATALYTIC CONVERTER

TECHNICAL FIELD

The present invention relates to a catalytic converter that is accommodated and fixed in a pipe constituting an exhaust system for exhaust gas.

BACKGROUND ART

In various industries, various efforts to reduce environmental burden have been made on a global scale. In particular, in the automobile industry, the development of techniques has progressed for the spread of not only a gasoline engine vehicle having superior fuel efficiency but also a so-called eco car such as a hybrid vehicle or an electric vehicle and for further improvement in the performance of the vehicles.

Incidentally, in an exhaust system for exhaust gas that connects a vehicle engine and a muffler to each other, a catalytic converter for purifying exhaust gas is generally provided.

The engine may emit environmentally harmful materials such as CO, $NO_x$, or unburned HC or VOC. In order to convert such harmful materials into environmentally acceptable materials, catalyst layers formed of a noble metal catalyst such as palladium or platinum are formed on cell wall surfaces of a substrate including plural cells. More specifically, on the cell wall surfaces of the plural cells, the catalyst layers are formed in a longitudinal direction of the substrate which is a direction in which exhaust gas flows. By causing exhaust gas to flow through the catalytic converter including the substrate having the above-described configuration, CO is converted into $CO_2$, $NO_x$ is converted into $N_2$ and $O_2$, and VOC is burned to produce $CO_2$ and $H_2O$.

However, for example, for a substrate including cells having a honeycomb structure, a catalytic converter having a uniform cell density of the substrate is generally used. However, since an exhaust gas flow rate in a center region of a cross-section of the substrate is higher than that in a peripheral region thereof, there is a problem in that the catalyst layers of the entire substrate cannot be sufficiently utilized. Therefore, by using a catalytic converter in which a cell density of a center region of a substrate is higher than that of a peripheral region thereof in consideration of the above exhaust gas flow rate variation, a flow rate variation in a cross-section of a substrate can be reduced as much as possible. Accordingly, catalyst layers of the entire catalytic converter can be efficiently utilized to purify exhaust gas.

Here, PTL 1 discloses a technique of improving exhaust gas purification performance by causing the amount of a noble metal catalyst supported on a center region (here, middle portion) to be different from that supported on a peripheral region (here, peripheral portion), for example, in a substrate having a honeycomb structure in which the cell density is uniform in the entire catalytic converter (here, catalyst body). More specifically, in the catalyst body, the amount of catalyst per unit volume supported on the middle portion having a large amount of gas flow is set to be 1.1 times or higher than that on the peripheral portion. However, in this technique, the cell density of the entire catalyst is uniform, and thus it is difficult to expect high exhaust gas purification performance. In addition, this technique also has a problem in that, when the amount of a noble metal catalyst increases, a large amount of hydrogen sulfide which causes an odor during exhaust gas purification is produced.

CITATION LIST

Patent Literature

PTL 1: Japanese Patent Application Publication No. 2002-177794

SUMMARY OF THE INVENTION

The invention has been made in consideration of the above-described problems, and an object thereof is to provide a catalytic converter in which the entire catalyst constituting the catalytic converter can be efficiently utilized to purify exhaust gas, and the emission of hydrogen sulfide can be suppressed.

In order to achieve the above-described object, according to the present invention, there is provided a catalytic converter including: catalyst layers formed of a noble metal catalyst that are formed on cell wall surfaces of a substrate having a cell structure in a longitudinal direction of the substrate in which gas flows, in which the substrate has a center region having a relatively high cell density and a peripheral region having a relatively low cell density, and lengths of the catalyst layers of the center region and the peripheral region in the longitudinal direction are the same as each other, or the length of the catalyst layer of the peripheral region in the longitudinal direction is shorter than that of the center region.

In the catalytic converter according to the present invention, the substrate including, for example, plural cells has a center region and a peripheral region which have different cell densities, in which the cell density of the center region is relatively high. As a result, a difference between exhaust gas flow rates of the center region and the peripheral region can be reduced as compared to a case of a substrate having a uniform cell density, and the entire catalyst constituting the catalytic converter can be efficiently utilized to purify exhaust gas. Further, the lengths of the catalyst layers of the center region and the peripheral region in the longitudinal direction (length in the direction in which exhaust gas flows through the inside of the substrate) are the same as each other, or the length of the catalyst layer of the peripheral region in the longitudinal direction is shorter than that of the center region. As a result, both superior exhaust gas purification performance and a high effect of suppressing hydrogen sulfide can be expected.

The reason will be described below. That is, in a cross-sectional view taken along a cross-section in a longitudinal direction of a substrate, in a substrate having a relatively high cell density in a center region thereof, the amount of exhaust gas flowing to a peripheral region having a relatively low cell density is more than that of a substrate having a uniform cell density per unit volume. In regard to the lengths of the catalyst layers formed on the cell wall surfaces in the longitudinal direction of the substrate (the lengths of the catalyst layers are set to have various ratios with respect to the length of the substrate in the longitudinal direction), when catalyst layers of a substrate having different cell densities are compared to catalyst layers of a substrate of the related art having a uniform cell density in the entire substrate, the amount of exhaust gas (amount of exhaust gas to be purified) flowing to a peripheral region having a low cell density is more than that of the substrate of the related art having a uniform cell density. Accordingly, sufficient purification performance cannot be obtained. By generating a difference in cell density between the center region and the peripheral region and setting the length of the catalyst layer of the peripheral region in the longitudinal direction to be longer than that of the catalyst layer of the center region, the contact area between the catalyst layer of the peripheral region and exhaust gas can be increased, and exhaust gas purification performance can be improved.

However, a noble metal catalyst has a problem in that hydrogen sulfide which causes an odor during exhaust gas purification is likely to be emitted. Therefore, the longer the lengths of the catalyst layers, the more the emission amount of hydrogen sulfide. That is, a contradictory relationship is established between the exhaust gas purification performance and the hydrogen sulfide emission suppressing performance.

Therefore, in order to satisfy both the exhaust gas purification performance and the hydrogen sulfide emission suppressing performance, the catalytic converter according to the present invention is configured such that lengths of the catalyst layers of the center region and the peripheral region in the longitudinal direction are the same as each other, or the length of the catalyst layer of the peripheral region in the longitudinal direction is shorter than that of the center region.

In an embodiment of the catalyst layers formed on the cell wall surfaces, a configuration can be adopted in which: a two-layer structure including a lower layer, which is provided on a cell wall surface side, and an upper layer, which is provided above the lower layer, is adopted; and each layer is formed of one element or two or more elements among Pd, Pt, and Rh which are noble metal catalysts.

Here, as the substrate having a cell structure to be used, not only a ceramic material such as cordierite or silicon carbide which is formed of a composite oxide of magnesium oxide, aluminum oxide, and silicon dioxide; but also a material other than a ceramic material such as a metal material may be used. In addition, in this configuration, a so-called honeycomb structure including cells having plural lattice contours having, for example, rectangular, hexagonal, and octagonal shapes can be adopted.

In addition, in regard to the ratios of the catalyst layers, for example, the catalytic converter may have a configuration in which a ratio of the length of the catalyst layer of the center region in the longitudinal direction to a length of the substrate in the longitudinal direction is 70% to 90%.

In addition, in another embodiment relating to the ratios of the catalyst layers, the catalytic converter may have a configuration in which the ratio of the length of the catalyst layer of the center region in the longitudinal direction to the length of the substrate in the longitudinal direction is 80%; and a ratio of the length of the catalyst layer of the peripheral region in the longitudinal direction to the length of the substrate in the longitudinal direction is 50% to 80%.

Further, a configuration is preferable in which the cell density of the center region is in a range of higher than one time and two times or lower than the cell density of the peripheral region.

The reasons for setting the upper and lower limits to be in the numerical value range are as follows: when the ratio of the cell density is one time or lower, the control of the amount of exhaust gas flowing to cells of each region is insufficient due to a difference in cell density between the center region and the peripheral region; and when the ratio of the cell density exceeds two times, the amount of exhaust gas flowing to the peripheral region is excessively large, which may decrease purification performance.

The catalytic converter according to the present invention preferably has a cordierite honeycomb support having superior thermal shock resistance but may be an electrically heated catalytic converter (EHC: Electrically Heated Converter). In the electrically heated catalytic converter, for example, a pair of electrodes are attached to a honeycomb catalyst, the honeycomb catalyst is heated by causing a current to flow through the electrodes, and the activity of the honeycomb catalyst is improved so as to detoxify the exhaust gas passing therethrough. By applying this electrically heated catalytic converter to an exhaust system for exhaust gas that connects a vehicle engine and a muffler to each other, exhaust gas can be purified not only at room temperature but also at a cold temperature by activating the catalyst due to electric heating.

As can be seen from the above description, in the catalytic converter according to the present invention, the substrate which is a component thereof has a center region having a relatively high cell density and a peripheral region having a relatively low cell density, and lengths of the catalyst layers of the center region and the peripheral region in the longitudinal direction are the same as each other, or the length of the catalyst layer of the peripheral region in the longitudinal direction is shorter than that of the center region. As a result, the catalytic converter which is superior in both exhaust gas purification performance and hydrogen sulfide emission suppressing performance can be provided.

MODES FOR CARRYING OUT THE INVENTION

Hereinafter, an embodiment of a catalytic converter according to the present invention will be described with reference to the drawings.

Exhaust System for Exhaust Gas

First, an exhaust system for exhaust gas in which the catalytic converter according to the present invention is provided will be briefly described. In the exhaust system for exhaust gas to which the catalytic converter according to the present invention is applied, an engine, a three-way catalytic converter, a sub muffler, and a main muffler are disposed and connected to each other through a system pipe, and exhaust gas produced from the engine flows to each unit through the system pipe and is exhausted. Next, hereinafter, the embodiment of the catalytic converter will be described.

Embodiment of Catalytic Converter

Figure 1:
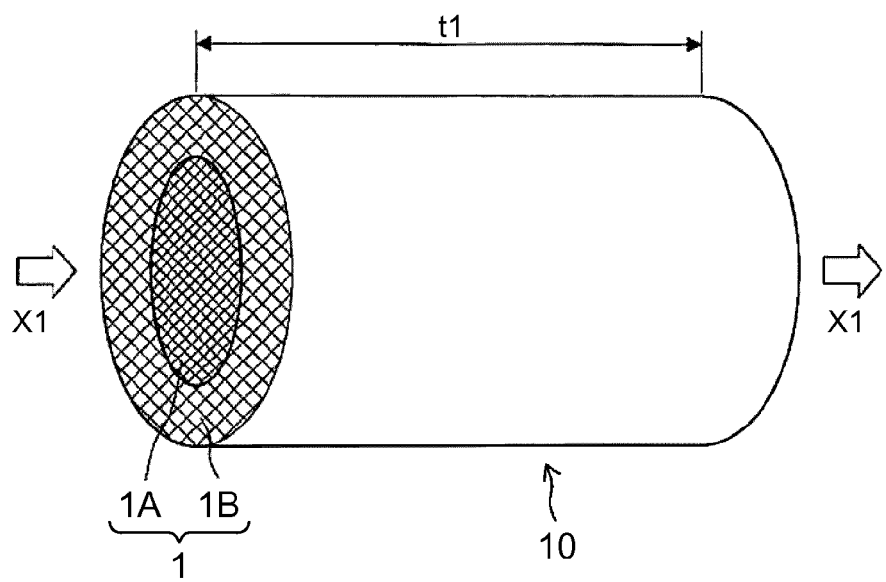
FIG. 1 is a schematic diagram showing an embodiment of a catalytic converter according to the present invention.
Figure 2A:
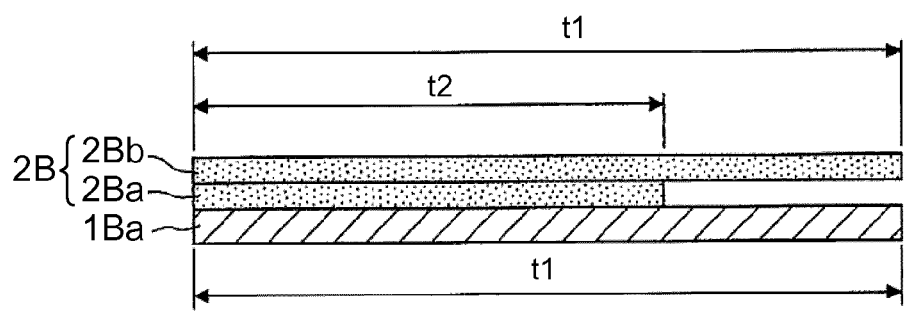
FIG. 2A is a schematic diagram showing, in a peripheral region of a substrate, the length of a cell wall surface in a longitudinal direction thereof and the lengths of upper and lower layers of a catalyst layer having a two-layer structure in the longitudinal direction.
Figure 2B:
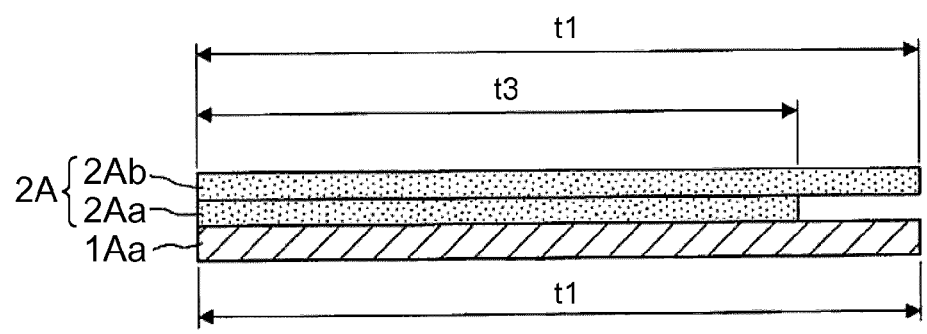
FIG. 2B is a schematic diagram showing, in a center region of the substrate, the length of a cell wall surface in the longitudinal direction and the lengths of upper and lower layers of a catalyst layer having a two-layer structure in the longitudinal direction.
Figure 3:
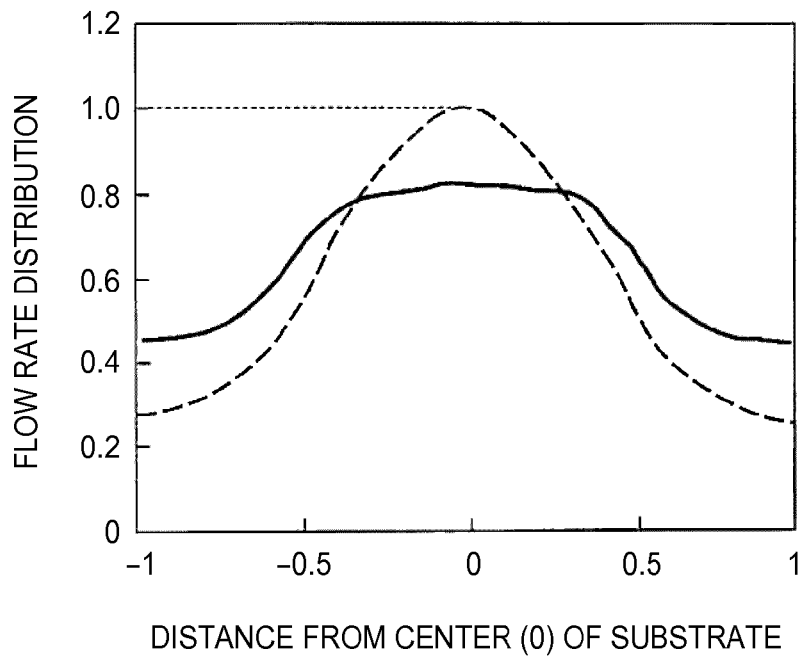
FIG. 3 is a graph showing the exhaust gas flow rate distributions of a substrate having a uniform cell density and the substrate having different cell densities between the center region and the peripheral region.

FIG. 1 is a schematic diagram showing the embodiment of the catalytic converter according to the present invention. FIG. 2A is a schematic diagram showing, in a peripheral region of a substrate, the length of a cell wall surface in a longitudinal direction thereof and the lengths of upper and lower layers of a catalyst layer having a two-layer structure in the longitudinal direction, and FIG. 2B is a schematic diagram showing, in a center region of the substrate, the length of a cell wall surface in the longitudinal direction and the lengths of upper and lower layers of a catalyst layer having a two-layer structure in the longitudinal direction. In addition, FIG. 3 is a graph showing the exhaust gas flow rate distributions of a substrate having a uniform cell density and the substrate having different cell densities between the center region and the peripheral region.

Briefly, a catalytic converter 10 shown in FIG. 1 includes: a cylindrical substrate 1 having plural cells; and catalyst layers having a two-layer structure that are formed on cell wall surfaces constituting the cells.

Here, examples of a material of the substrate 1 include a ceramic material such as cordierite or silicon carbide which is formed of a composite oxide of magnesium oxide, aluminum oxide, and silicon dioxide; and a material other than a ceramic material such as a metal material. In addition, examples of a support constituting the catalyst layers that are formed on the cell wall surfaces of the substrate include oxides containing at least one porous oxide of $CeO_2$, $ZrO_2$, and $Al_2O_3$ as a major component; one oxide among ceria ($CeO_2$), zirconia ($ZrO_2$), and alumina ($Al_2O_3$); and a composite oxide formed of two or more oxides among ceria ($CeO_2$), zirconia ($ZrO_2$), and alumina ($Al_2O_3$) (for example, a $CeO_2$—$ZrO_2$ compound which is a CZ material, or an $Al_2O_3$—$CeO_2$—$ZrO_2$ tertiary composite oxide (ACZ material) into which $Al_2O_3$ is introduced as a diffusion barrier).

The substrate 1 has a honeycomb structure including cells having plural lattice contours having, for example, rectangular, hexagonal, and octagonal shapes, and exhaust gas flows through the inside of each cell (X1 direction).

The substrate 1 has two regions including: a center region 1A having a relatively high cell density; and a peripheral region 1B having a relatively low cell density.

Here, the exhaust gas flow rate distributions will be described with reference to FIG. 3. In the exhaust gas flow rate distributions of FIG. 3, two end points of a diameter centering on the center 0 of a cross-sectional circle of the substrate are set as −1 and 1, and intermediate positions therebetween are shown as ratios with respect to a radius. The exhaust gas flow rate at each position is shown as a ratio with respect to the flow rate at the center of a substrate of a catalytic converter having a uniform cell density of the substrate.

In the catalytic converter having a uniform cell density of the substrate, as indicated by a dashed line in FIG. 3, the exhaust gas flow rate of the center region of a cross-section of the substrate is significantly higher than that of the peripheral region thereof. Therefore, there is a problem in that it is difficult to sufficiently utilize the catalyst layers of the entire substrate. On the other hand, as in the catalytic converter 10 according to the present invention, by forming the substrate 1 using the two regions having different cell densities and setting the cell density of the peripheral region 1B to be relatively low, as indicated by a solid line in the same drawing, a difference in flow rate between the center region 1A and the peripheral region 1B of the substrate 1 can be significantly reduced, and all the catalyst layers included in the catalytic converter 10 can be efficiently utilized to purify exhaust gas.

Further, in the catalytic converter 10 shown in the drawings, the length of the catalyst layer formed on the cell wall surface of each region varies between the peripheral region 1B and the center region 1A of the substrate 1.

Here, a catalyst layer 2B formed on a surface of a cell wall surface 1Ba of the peripheral region 1B shown in FIG. 2(a) has a two-layer structure including a lower layer 2Ba, which is provided on the cell wall surface 1Ba side, and an upper layer 2Bb, which is provided above the lower layer 2Ba and come into direct contact with exhaust gas, and each layer is formed of one element or two or more elements among Pd, Pt, and Rh which are noble metal catalysts. Likewise, a catalyst layer 2A formed on a surface of a cell wall surface 1Aa of the center region 1A shown in FIG. 2(b) has a two-layer structure including a lower layer 2Aa, which is provided on the cell wall surface 1Aa side, and an upper layer 2Ab, which is provided above the lower layer 2Aa, and each layer is formed of one element or two or more elements among Pd, Pt, and Rh which are noble metal catalysts.

When the length of the substrate 1 in the longitudinal direction (the length in the direction in which exhaust gas flows) is represented by t1, both the lengths of the cell wall surfaces 1Aa, 1Ba are t1, and both the lengths of the upper layers 2Ab, 2Bb of the catalyst layers 2A, 2B are t1. On the other hand, the lengths of the lower layers 2Aa, 2Ba of the catalyst layers 2A, 2B are t3 and t2, respectively. A relationship of t1>t3>t2 is established.

In this way, by generating a difference in cell density between the center region 1A and the peripheral region 1B and setting the length of (the lower layer 2Ba of) the catalyst layer 2B of the peripheral region 1B in the longitudinal direction to be shorter than that of (the lower layer 2Aa of) the catalyst layer 2A of the center region 1A, both superior exhaust gas purification performance and a high effect of suppressing hydrogen sulfide can be expected from the catalytic converter 10.

In addition, in regard to the cell density, it is preferable that the cell density of the center region 1A is set to be in a range of higher than one time and two times or lower than the cell density of the peripheral region 1B. The reasons for setting the upper and lower limits to be in the numerical value range are as follows: when the ratio of the cell density is one time or lower, the control of the amount of exhaust gas flowing to cells of each region is insufficient due to a difference in cell density between the center region 1A and the peripheral region 1B; and when the ratio of the cell density exceeds two times, the amount of exhaust gas flowing to the peripheral region 1B is excessively large, which may decrease purification performance.

Instead of the two-layer structure shown in the example of the drawings, the catalyst layers may have, for example, a configuration of a one-layer structure or a configuration of a three-layer structure.

Experiment Relating to Length of Catalyst Layer of Peripheral Region (Ratio Thereof to Length of Substrate) and Emission Amount of Hydrogen Sulfide, Experiment Relating to Length of Catalyst Layer of Peripheral Region and Emission Amount of $NO_x$, and Results of Experiments The present inventors prepared honeycomb-structured substrates of Examples 1 to 6 and Comparative Examples 1 to 7, performed experiments of measuring the emission amount of hydrogen sulfide when varying the length of the catalyst layer of the peripheral region (the ratio thereof to the length of the substrate), and performed experiments of measuring the emission amount of $No_x$ when varying the length of the catalyst layer of the peripheral region.

Example 1

A honeycomb-structured substrate formed of cordierite was prepared by extrusion, and a difference in cell density was generated between the center region and the peripheral region. Regarding the size of the honeycomb structure, the diameter of a circular cross-section perpendicular to a flowing direction of exhaust gas was ϕ103 mm, and the length t1 thereof in a longitudinal direction thereof was 105 mm. The cell density of a peripheral region having a relatively low cell density was 400 cpsi (62 cells/cm$^2$), the cell density of a center region having a relatively high cell density was 600 cpsi (93 cells/cm$^2$), a switch line between the center region and the peripheral region was at a position of ϕ70 mm, and the lattice shape of the cells was rectangular. Further, the catalyst layers had a two-layer structure, the support amounts of lower layers as Pt-supported layers were 0.7 g/L, and the support amounts of upper layers as Rh-supported layers were 0.2 g/L. In regard to the lengths of the catalyst layers, the lengths of the upper layers of the catalyst layers of the center region and the peripheral region were the same as the length of the substrate (the ratio thereof to the length t1 of the substrate was 100%), and the length of the lower layer of the peripheral region was 70% of the length of the substrate, and the length of the lower layer of the center region was 80% of the length of the substrate.

Example 2

Example 2 was the same as Example 1, except that, in regard to the lengths of the catalyst layers, the length of the lower layer of the peripheral region was 60% of the length of the substrate.

Example 3

Example 3 was the same as Example 1, except that, in regard to the lengths of the catalyst layers, the length of the lower layer of the peripheral region was 80% of the length of the substrate (accordingly, the lengths of the lower layers of the catalyst layers of the peripheral region and the center region were the same as each other).

Example 4

Example 4 was the same as Example 1, except that, in regard to the lengths of the catalyst layers, the length of the lower layer of the peripheral region was 50% of the length of the substrate.

Comparative Example 1

A honeycomb-structured substrate formed of cordierite was prepared by extrusion, and the cell density was uniform in a cross-section. Regarding the size of the honeycomb structure, the diameter of a circular cross-section perpendicular to a flowing direction of exhaust gas was ϕ103 mm, and the length t1 thereof in a longitudinal direction thereof was 105 mm. The cell density was 400 cpsi (62 cells/cm$^2$), and the lattice shape of the cells was rectangular. Further, the catalyst layers had a two-layer structure, the support amounts of lower layers as Pt-supported layers were 0.7 g/L, and the support amounts of upper layers as Rh-supported layers were 0.2 g/L. In regard to the lengths of the catalyst layers, the lengths of the upper layers were the same (100%) as the length of the substrate, and the lengths of the lower layers were 80% of the length of the substrate.

Comparative Example 2

Comparative Example 2 was the same as Example 1, except that, in regard to the lengths of the catalyst layers, the length of the lower layer of the peripheral region was 90% of the length of the substrate.

Comparative Example 3

Comparative Example 3 was the same as Example 1, except that, in regard to the lengths of the catalyst layers, the length of the lower layer of the peripheral region was 100% of the length of the substrate.

In addition, the details of other Examples 5 and 6 and Comparative Examples 4 to 7 will be shown in Table 2 below.

Experimental Method

In a purification performance evaluation test, an actual engine was used, an A/F ratio was inverted from a lean side (15.1) to a rich side (14.1), and the engine was held in a rich atmosphere. At this time, the emission amount of $NO_x$ was measured. When the emission amount of Comparative Example 1 was represented by 100%, ratios of the emission amounts of the other specimens thereto were obtained.

On the other hand, in a hydrogen sulfide emission amount measurement test, a vehicle was driven at a constant speed of 40 km/h to adsorb sulfur, and was accelerated to 100 km/h with a wide-open throttle. After the speed reached 100 km/h, the throttle was closed to stop the vehicle. When an engine idle state was left to stand for a certain period of time, the emission amount of hydrogen sulfide was measured. When the emission amount of Comparative Example 1 was represented by 100%, ratios of the emission amounts of the other specimens thereto were obtained.

The measurement results are shown in Tables 1 and 2 and FIGS. 4 to 7.

TABLE 1

| Sample | Cell Specification (Whether or Not Cell Densities of Center Region and Peripheral Region are Same as or Different from Each Other) | Length of Catalyst layer of Region Having High Cell Density (Ratio (%) to Length of Substrate) | Length of Catalyst layer of Region Having Low Cell Density (Ratio (%) to Length of Substrate) | Emission Amount of Hydrogen Sulfide (Ratio (%) To Comparative Example 1) | Emission Amount of $NO_x$ (Ratio (%) To Comparative Example 1) |
|---|---|---|---|---|---|
| Example 1 | Different | 80 | 70 | 96.8 | 93.4 |
| Example 2 | Different | 80 | 60 | 94.1 | 97.1 |
| Example 3 | Different | 80 | 80 | 99.6 | 89.7 |
| Example 4 | Different | 80 | 50 | 91.4 | 100.8 |
| Comparative Example 1 | Same | 80 | 80 | 100 | 100 |
| Comparative Example 2 | Different | 80 | 90 | 102.3 | 86.0 |
| Comparative Example 3 | Different | 80 | 100 | 105.0 | 82.3 |

TABLE 2

| Sample | Cell Specification (Whether or Not Cell Densities of Center Region and Peripheral Region are Same as or Different from Each Other) | Length of Catalyst layer of Region Having High Cell Density (Ratio (%) to Length of Substrate) | Length of Catalyst layer of Region Having Low Cell Density (Ratio (%) to Length of Substrate) | Emission Amount of Hydrogen Sulfide (Ratio (%) To Comparative Example 1) | Emission Amount of $NO_x$ (Ratio (%) To Comparative Example 1) |
|---|---|---|---|---|---|
| Comparative Example 4 | Different | 90 | 80 | 102.7 | 86.8 |
| Example 5 | Different | 90 | 60 | 96.6 | 92.2 |
| Example 6 | Different | 70 | 70 | 93.4 | 97.3 |
| Comparative Example 5 | Different | 70 | 50 | 87.3 | 105.5 |
| Comparative Example 6 | Different | 60 | 90 | 96.4 | 94.8 |
| Comparative Example 7 | Different | 60 | 60 | 87.2 | 106.8 |

Figure 4:
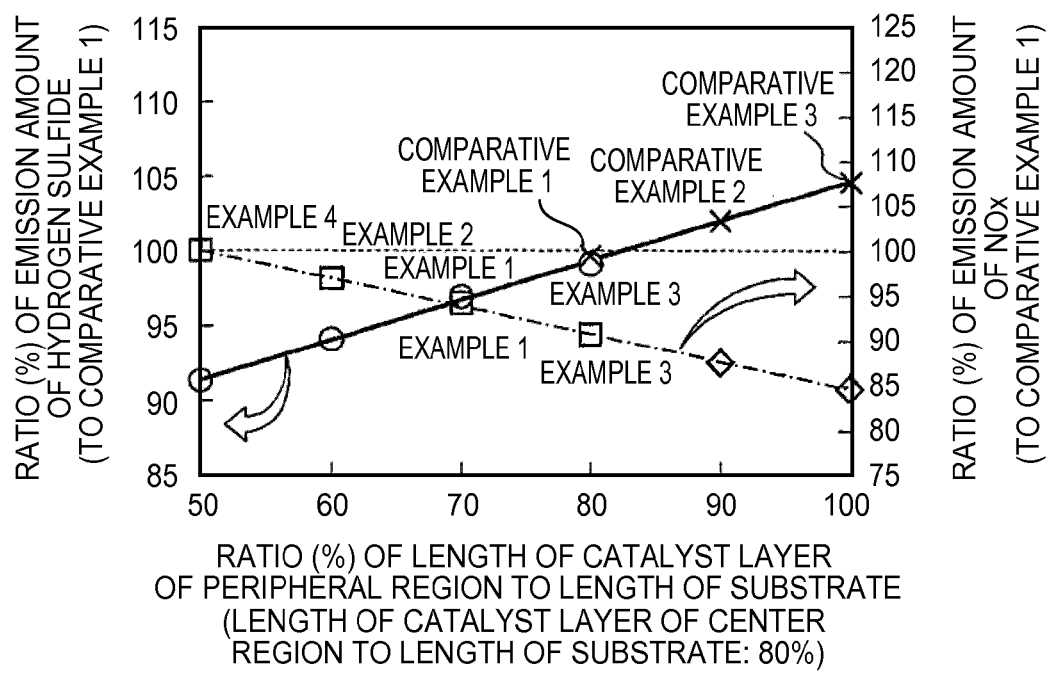
FIG. 4 is a graph showing the experiment results relating to the length of the catalyst layer of the peripheral region (the ratio thereof to the length of the substrate) and the emission amount of hydrogen sulfide, and the experiment results (Examples 1 to 4 and Comparative Examples 1 to 3) relating to the length of the catalyst layer of the peripheral region and the emission amount of $NO_x$.

From Table 1 and FIG. 4, the following results were obtained: in Examples 1 to 4, the emission amount of hydrogen sulfide was reduced as compared to Comparative Example 1; and in Examples 1 to 3, the emission amount of $NO_x$ was also reduced, and both the hydrogen sulfide emission suppressing effect and the exhaust gas purifying effect were satisfied.

Figure 5:
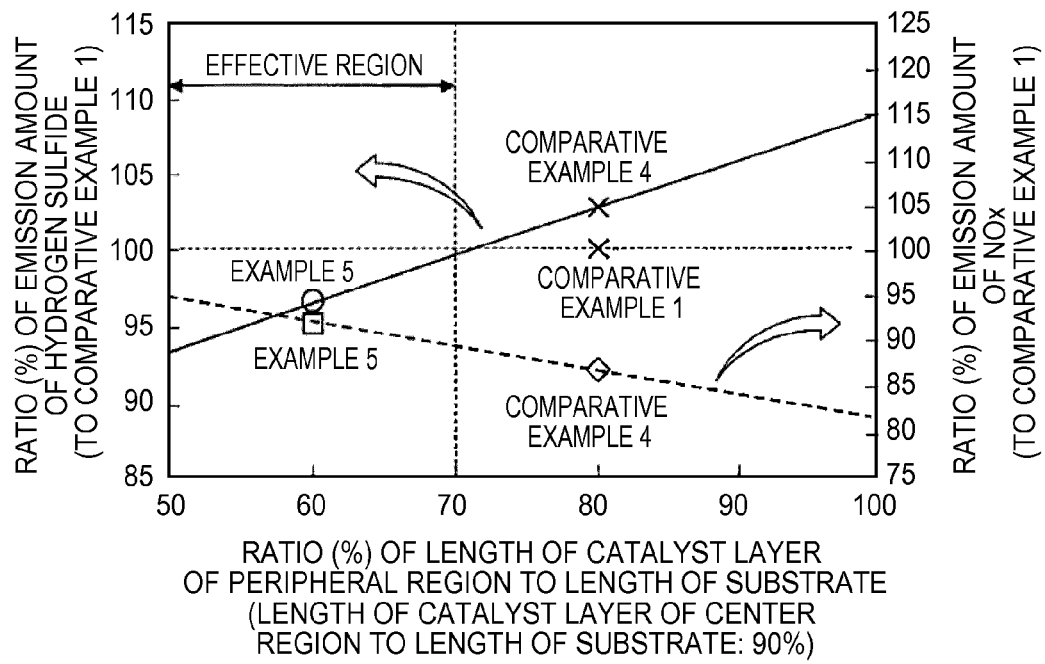
FIG. 5 is a graph showing the experiment results relating to the length of the catalyst layer of the peripheral region (the ratio thereof to the length of the substrate) and the emission amount of hydrogen sulfide, and the experiment results (Example 5 and Comparative Examples 1 and 4) relating to the length of the catalyst layer of the peripheral region and the emission amount of $NO_x$.
Figure 6:
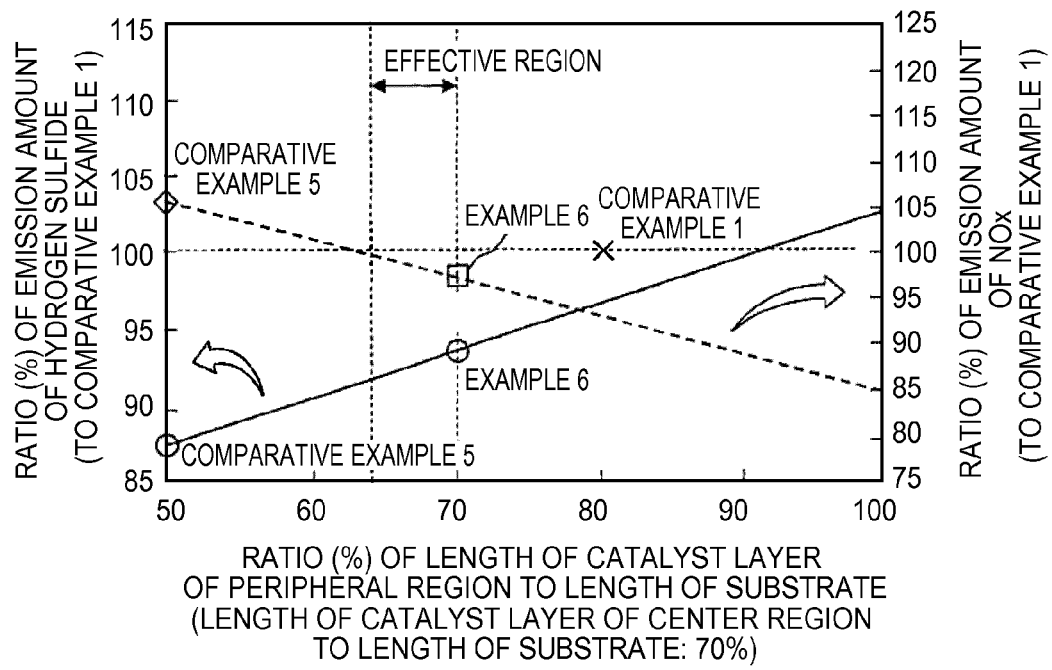
FIG. 6 is a graph showing the experiment results relating to the length of the catalyst layer of the peripheral region (the ratio thereof to the length of the substrate) and the emission amount of hydrogen sulfide, and the experiment results (Example 6 and Comparative Examples 1 and 5) relating to the length of the catalyst layer of the peripheral region and the emission amount of $NO_x$.

In addition, it was found from FIGS. 5 and 6 that, in effective regions of the drawings, the emission amount of hydrogen sulfide and the emission amount of $NO_x$ of Examples 5 and 6 were able to be reduced as compared to Comparative Example 1.

Figure 7:
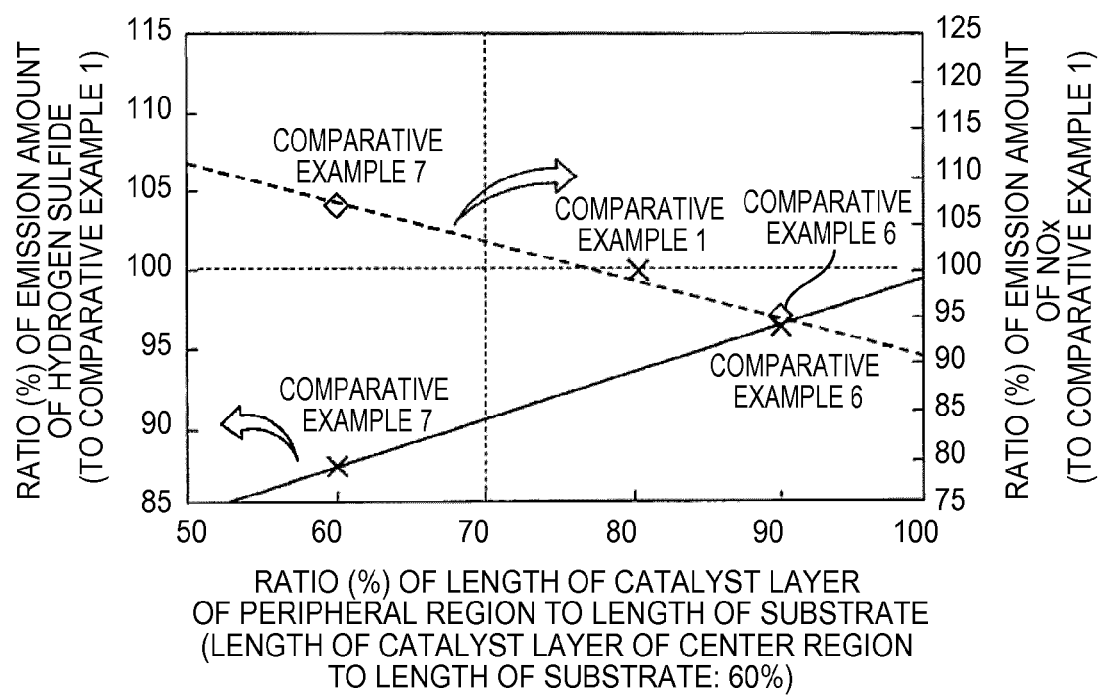
FIG. 7 is a graph showing the experiment results relating to the length of the catalyst layer of the peripheral region (the ratio thereof to the length of the substrate) and the emission amount of hydrogen sulfide, and the experiment results (Comparative Examples 1, 6, and 7) relating to the length of the catalyst layer of the peripheral region and the emission amount of $NO_x$.

In addition, it was found from FIG. 7 that, when the length of the catalyst layer of the center region was 60%, there was no region in which both the emission amount of hydrogen sulfide and the emission amount of $NO_x$ were reduced as compared to Comparative Example 1.

It was found from FIGS. 4 to 7 that the ratio range of the length of the catalyst layer of the center region to the substrate was able to be defined to be 70% to 90% in which each example was superior to Comparative Example 1.

Hereinabove, the embodiments of the invention have been described with reference to the drawings. However, a specific configuration is not limited to the embodiments, and design changes and the like which are made within a range not departing from the scope of the invention are included in the invention.

REFERENCE SIGNS LIST

1 . . . SUBSTRATE, 1A . . . CENTER REGION, 1Aa . . . CELL WALL SURFACE, 1B . . . PERIPHERAL REGION, 1Ba . . . CELL WALL SURFACE, 2A . . . CATALYST LAYER (CATALYST LAYER OF CENTER REGION), 2Aa . . . LOWER LAYER, 2Ab . . . UPPER LAYER, 2B . . . CATALYST LAYER (CATALYST LAYER OF PERIPHERAL REGION), 2Ba . . . LOWER LAYER, 2Bb . . . UPPER LAYER, 10 . . . CATALYTIC CONVERTER

The invention claimed is:
1. A catalytic converter comprising:
a substrate that has a cell structure and is configured to allow gas to flow through the substrate; and
a catalyst layer that is formed of a noble metal catalyst and is formed on a cell wall surface of the substrate, the catalyst layer extending in a longitudinal direction of the substrate, wherein the substrate has a center region and a peripheral region, the center region having a cell density higher than a cell density of the peripheral region, the cell wall surface includes a center cell wall surface provided in the center region and a peripheral cell wall surface provided in the peripheral region, the cell density of the center region is two times or lower than the cell density of the peripheral region, the catalyst layer includes a first catalyst layer provided in the center region and a second catalyst layer provided in the peripheral region, the first catalyst layer includes a first lower layer and a first upper layer, the first lower layer is provided on the center cell wall surface, the first upper layer is provided on the first lower layer and is in direct contact with a flow path for exhaust gas, the second catalyst layer includes a second lower layer and a second upper layer, the second lower layer is provided on the peripheral cell wall surface, the second upper layer is provided on the second lower layer and is in direct contact with a flow path for exhaust gas, a length of the substrate, a length of the first upper layer, and a length of the second upper layer are equal to each other in the longitudinal direction, a ratio of a length of the first lower layer to the length of the substrate is 80% in the longitudinal direction, and a ratio of a length of the second lower layer to the length of the substrate is 50% to 80% in the longitudinal direction.

2. A catalytic converter comprising:

a substrate that has a cell structure and is configured to allow gas to flow through the substrate; and a catalyst layer that is formed of a noble metal catalyst and is formed on a cell wall surface of the substrate, the catalyst layer extending in a longitudinal direction of the substrate, wherein the substrate has a center region and a peripheral region, the center region having a cell density higher than a cell density of the peripheral region, the cell wall surface includes a center cell wall surface provided in the center region and a peripheral cell wall surface provided in the peripheral region, the cell density of the center region is two times or lower than the cell density of the peripheral region, the catalyst layer includes a first catalyst layer provided in the center region and a second catalyst layer provided in the peripheral region, the first catalyst layer includes a first lower layer and a first upper layer, the first lower layer is provided on the center cell wall surface, the first upper layer is provided on the first lower layer and is in direct contact with a flow path for exhaust gas, the second catalyst layer includes a second lower layer and a second upper layer, the second lower layer is provided on the peripheral cell wall surface, the second upper layer is provided on the second lower layer and is in direct contact with a flow path for exhaust gas, a length of the substrate, a length of the first upper layer, are a length of the second upper layer are equal to each other in the longitudinal direction, and a ratio of a length of the first lower layer to the length of the substrate is 70% to 90% in the longitudinal direction.

* * * * *